(12) United States Patent
Harrison et al.

(10) Patent No.: US 7,590,570 B2
(45) Date of Patent: Sep. 15, 2009

(54) METHOD, APPARATUS AND SYSTEM FOR PROVIDING PRODUCT ADVISORY INFORMATION FOR A WEB-BASED SALES APPLICATION

(75) Inventors: Allen Ray Harrison, Houston, TX (US); Bruce Alan Oney, Sugar Land, TX (US); Murli Challappa, Sugar Land, TX (US); James H. White, Banchory (GB)

(73) Assignee: Schlumberger Technology Corporation, Austin, TX (US)

( * ) Notice: Subject to any disclaimer, the term of this patent is extended or adjusted under 35 U.S.C. 154(b) by 652 days.

(21) Appl. No.: 10/099,825

(22) Filed: Mar. 15, 2002

(65) Prior Publication Data

US 2002/0165802 A1 Nov. 7, 2002

Related U.S. Application Data

(60) Provisional application No. 60/283,492, filed on Apr. 12, 2001.

(51) Int. Cl.
*G06F 17/30* (2006.01)
(52) U.S. Cl. .......................................... 705/27; 705/26
(58) Field of Classification Search .............. 705/26–27
See application file for complete search history.

(56) References Cited

U.S. PATENT DOCUMENTS 6,032,129 A * 2/2000 Greef et al. .................. 705/27
6,167,383 A * 12/2000 Henson ....................... 705/26
6,317,718 B1 11/2001 Fano
6,370,516 B1 4/2002 Reese
2002/0077931 A1 * 6/2002 Henrion et al. ............... 705/26

OTHER PUBLICATIONS

Cellmania: "CellMania launches in record time using BroadVision One-to-One Business Commerce," PR Newswire, Sep 8, 1999; Dialog file 20 #07103537, 3pgs.*
International Search Report in PCT/02/11268 dated Jul. 24, 2002 (5 pages).

* cited by examiner

*Primary Examiner*—Robert M. Pond
(74) *Attorney, Agent, or Firm*—Robert P. Lord; Bryan P. Galloway

(57) ABSTRACT

An apparatus, system, and method are provided for receiving requirements information from a user via a web browser. The request and the requirements information are received by a web server and forwarded to a correlation engine. The correlation engine is operatively connected to, among other things, a catalog database listing various products that are available to the user, a pricing database that contains price information for a plurality of the products, an advisor database that contains feature information about the products, and a client relationship manager that retains information about the user. The correlation engine correlates the data from the various database through appropriate function modules in order to determine which product best suits the user's requirements based on price, availability, and feature set. The user is presented with a coherent set of choices and is thus enabled to select one or more items from those choices to consummate a sale for the products.

19 Claims, 5 Drawing Sheets

$R_T$ = Recommendation Value (ranges between 0 and 1) for $T$
$W_n$ = Weighting factor associated with $P_n$
$P_n$ = Particular parameter (depth, borehole size, pressure, etc.)
$T$ = Thing which can be one of the following:
 • Line Item material;
 • Line Item HL-LL material;
 • Package; or
 • Family.

$$R_T = \prod_{n=1}^{m} W_n(P_n)$$

METHOD, APPARATUS AND SYSTEM FOR PROVIDING PRODUCT ADVISORY INFORMATION FOR A WEB-BASED SALES APPLICATION

RELATED APPLICATION

This application is a conversion of Provisional U.S. Application Ser. No. 60/283,492 that was filed on Apr. 12, 2001 that was entitled "Method, Apparatus and System for Providing Product Advisory Information for a Web-Based Sales Application" by the same inventors as the present application.

BACKGROUND

1. Technical Field of the Invention

This invention relates in general to dynamic web sites, and more particularly. to the dynamic generation of web pages having context-specific content based on user requirements and information available about products and solutions that best fit the user's requirements.

2. Background of the Related Art

In the prior art, web-based sales often involve the choice of products and services from undifferentiated lists (catalogs). Commercial "configurators" provide a means for determining what items can combine and/or operate together to provide a packaged product.

Known commercial configurators enlist "rules" that usually are used to determine the application of an item as a constituent of a whole product. For example, when determining what disk drives will fit into a computer system, a configurator will provide to the user a list of several drives (items) that will physically/electrically function in the computer.

A substantial enhancement would be to provide to users some ability to receive recommendations, evaluations or comparisons of the available choices. Additional synthesis could be provided in a web-based (remote, electronic network served) application that compares, advises, or recommends in a quantitative or qualitative way competing, alternative or applicable products or services.

There is, therefor, a need in the art for a web-based application that compares and advises a user of the best choice from a plurality of choices based on the user's need. It is an object of the present invention to remedy deficiencies in the prior art.

SUMMARY OF THE INVENTION

In accordance with the present invention, the disadvantages and problems associated with selecting from a plurality of products in the context of a sale on a wide area network ("WAN") such as the Internet have been substantially reduced or eliminated. In particular, information about a variety of products that can exceed a minimum threshold of acceptability can be ranked by additional factors such as price, feature set, and past performance for the particular user and other users, and the various factors and products can be correlated and presented to the user as a ranking. The product listings presented to the user can contain price information and links to feature sets and more detailed product descriptions. Further, the user will have the opportunity to add one or more of the products to his or her "shopping cart" for purchase.

In accordance with one embodiment of the present invention, an apparatus, system, and method are provided for receiving requirements information from a user via a web browser. The request and requirements information are received by a web server and forwarded to a correlation engine. The correlation engine is operatively connected to, among other things, a catalog database listing various products that are available to the user, a pricing database that contains price information for a plurality of the products, an advisor database that contains feature information about the products, and a client relationship manager that retains information about the user. The correlation engine correlates the data from the various databases through appropriate function modules in order to determine which product best suites the user's requirements based on price, availability, and feature set. The user is presented with a coherent set of choices and is enabled to select one or more of those choices to consummate a sale of the products.

Important technical advantages of certain embodiments of the present invention include the ability to correlate both pricing information and product specifications and feature sets in order to determine which product or products best satisfy the user's requirements and provide to the user a ranking of those products so correlated.

Other important technical advantages of certain embodiments of the present invention include the ability of the user to purchase products directly from the same source of the price/feature ranking, thereby eliminating information-gathering steps and enabling the user to purchase a more suitable product in less time.

BRIEF DESCRIPTION OF THE DRAWINGS

For a more complete understanding of the present invention and its advantages, reference is now made to the following description, taken in conjunction with the accompanying drawings, in which.

DETAILED DESCRIPTION OF THE INVENTION

Figure 1:
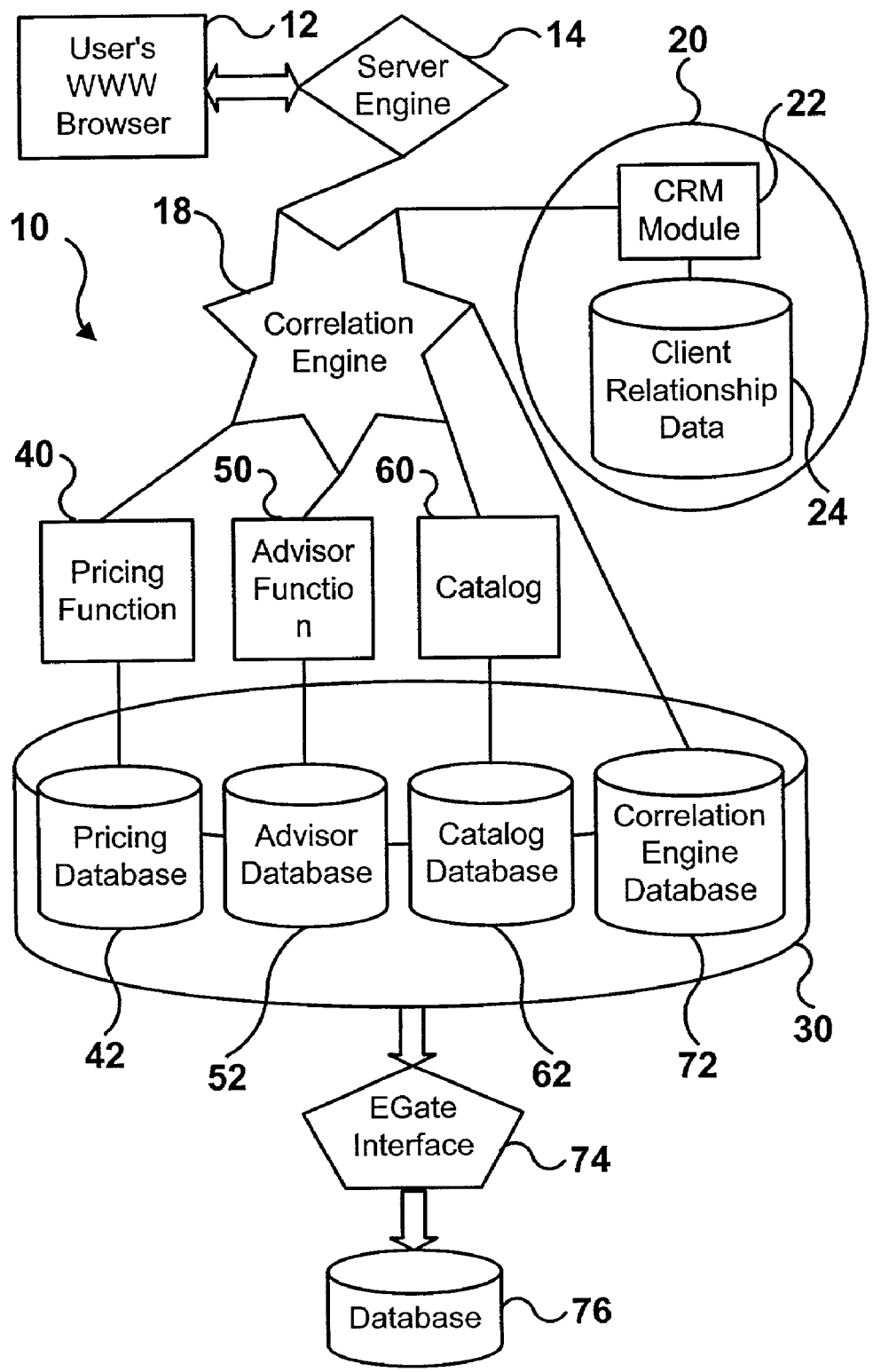
FIG. 1 is a block diagram illustrating the topology of the system of the present invention.

The present invention is an electronic catalog that provides a variety of services for the user. The present invention operates on a server computer system and is intended to be accessed through a local are network ("LAN") or a WAN such as the Internet. This allows the users to access the present invention from a variety of mechanisms, including client-specific software programs, or through a web browser. Cellular telephone customers and those with personal digital assistants ("PDA"), such as a PALM PILOT, manufactured by the 3Com Corporation of Santa Clara, Calif., may also be used with the present invention.

The present invention can provide a catalog and sales mechanism for a very wide variety of products and services, particularly where comparisons between multiple products and services are possible. While the present invention is product/service agnostic, the following example of oilfield wireline services will illustrate the scope and flexibility of the present invention. However, it will be clear to those skilled in the art, after examination of the following specification, that many other goods and services can be offered online by utilizing the method, system, and apparatuses of the present invention.

One illustrative application of the present invention provides a mechanism for selecting and building a quotation for oilfield wireline services. In general, oilfield wireline services refer to the practice of placing a remote-controlled apparatus at the end of a high-strength wire cable and lowering the apparatus into the wellbore. The apparatus then, via electrical, nuclear, sonic, mechanical or other probing technique, takes measurements of the geologic layers through which the wellbore passes. These measurements, in turn, provide a means for determining a wide range of physical properties about the wellbore and the earth's geology. While wireline services may be provided to individual, single oil wells, they may also be provided to multiple wells, and to fields of wells.

The present invention may be implemented as a set of one or more software processes that operate on a computer system. However, the present invention is also able to be implemented wholly in hardware or in any combination of hardware and software. The preferred embodiment of the present invention is implemented on software operating on a networked computer system that can communicate with users on remote computer systems. Virtually any programming language can be used to implement the present invention, including, but not limited to: C/C++, Pascal, Visual Basic, Python, Cobol, or some combination of those or other languages.

The advisor of the present invention first elicits information from the buyer (user) about his/her needs, objectives, problem-to-be-solved or usage of the product, service or solution. Then, using the information gathered from the user, the present invention evaluates the available products, services or solutions and advises which product, service or solution would "best" meet the needs of the buyer. In the preferred embodiment of the present invention, the evaluation is presented in terms of a comparative ranking or other means.

There is evaluation methodology for making recommendations. Although many methodologies may be employed by the present invention, one such technology involves weighing the alternatives and providing a fit-to-use valuation.

The present invention provides methodology for web-sales that includes quantitative or qualitative recommendations of products or services derived from user input and supplier domain knowledge or experience. This unique methodology is the marriage of advisor technology and the web-based sales process and can be used to tailor the purchase experience for the use of the product, service or solution based upon client-related information.

A typical web-sales user enters into a sales site via, e.g., the World Wide Web ("WWW") of the Internet and chooses items from a catalog. In some instances, a user may combine a group of items to form a finished product. The present invention provides additional methodology that is added to the usual sales methodology to form an automated mechanism for generating an evaluation, comparison, recommendation, assessment and/or advisory for the buyer by a qualitative and/or quantitative synthesis regarding which of the available choices the seller would recommend. The seller could employ proprietary and/or public knowledge to make such a recommendation.

One such mechanism for implementing the present invention involves collecting information (e.g., environmental, usage parameters, application objectives, etc.) from a potential buyer and using that information to provide qualitative and/or quantitative information and/or data reflecting the recommendation of the supplier. This quantitative data could be in the form of "rankings" and/or "weights."

One such means for determination of these rankings or weights could be via a mathematical algorithm whose functional parameter values are determined from buyer input. For example, for a product A, the recommendation, $R_A$, could be found from the formula:

$$R_A WF_1(X,Y,Z\ldots)*WF_2(S,T,U\ldots)*\ldots$$

where, $WF_1$ is the weighting function which depends upon single or multiple parameters X, Y, Z. Likewise, $WF_2$ is a function of parameters S, T, U. There would be similar evaluations for product B (e.g., $R_B$), and so on. The number of weighting functions and dependent parameters could be single or multiple. In the example above, the mathematical algorithm is a multiplication of the constituent parameters. Other algorithms, such as addition or summation, could be used to achieve similar or comparable results.

In one embodiment of the present invention, upon calculation of the weights or rankings, the advisor of the present invention displays a list of the available products and the advisor's corresponding recommendation. The recommendation may be displayed as a numeric value, a color, length of a bar, or other technique. The display order may correspond to the ranking, i.e., the best fit for the buyer's objectives. The buyer will then have a comparative evaluation of the available choices from which to make a final choice.

An alternate embodiment of the present invention is illustrated in FIG. 1 and consists of an apparatus 10 that provides quantitative and qualitative recommendations as the result of a request by a user. The apparatus 10 consists of a server engine 14 that is constructed and arranged to accept requests from a user via, for example, a web browser 12, and to send results back to the user. The present invention is also fitted with a database that includes a pricing database 42 for storing and retrieving, among other things, price information about different products within the catalog. An advisor database 52 is also included in the database 30 to store and retrieve information about feature sets for the various products. The catalog database 62 stores information about various products and services for later retrieval. Optionally, a content relationship system 20 having a content relationship manager ("CRM") can be included with the present invention for storing and retrieving client relationship data 20 that can be used to further tailor a response to a specific user.

The apparatus 10 of the present invention further includes a correlation engine 18, whose function will become apparent below. The various databases 42, 52, 62 are connected to the correlation engine 18 by a set of modules 40, 50, 60. The pricing function module 40 is operatively connected to the pricing database 42 and the correlation engine 18. The advisor function module 50 is operatively connected to the advisor database 52 and the correlation engine 18. Similarly, the catalog module 60 is operatively connected to the catalog database 62 and the correlation engine 18. The correlation engine database 72 is operatively connected to the correlation engine 18. The correlation engine database 72 is constructed and arranged to store a result of the correlation (advisory) process for future use.

In operation, when a user submits a request to the server engine 14, the server engine 14 forwards that request to the correlation engine 18. The correlation engine 18, in turn, retrieves pricing information from the pricing database 42 through the pricing function module 40, advisory information from the advisor database 52 through the advisor function module 50, and catalog information from the catalog database 62 through the catalog module 60, whereupon the correlation engine 18 correlates all of the information to form a response that is transmitted to the user through the server engine 14 to, for example, the user's web browser 12.

Additional topology of the apparatus of the present invention is illustrated in FIG. 1. Clients (users) input requests into the system of the present invention through browser 12. Browser 12 can be a standard WWW browser. User input is directed via a universal resource locator ("URL") request to the server engine 14. The server engine 14 can be any suitable web server that can process requests and responses from and to a user. The server engine 14 processes the user's request and forwards it on to correlation engine 18. The correlation engine 18 reviews the client's request, specifically, what the client is looking for, and what needs or requirements were input by the user to better explain the user's full set of requirements. Based on the user's requirements, information can be gathered from the pricing database 42 via the pricing function module 40. Similarly, the advisor database 52 information containing feature sets of the various products can be obtained through the advisor function module 50. The catalog database 62 contains all of the product information and can be accessed by the correlation engine 18 through the catalog module 60. Knowing what products are available from the catalog database 62, their feature sets from the advisor database 52, and the pricing information from the pricing database 42, the correlation engine 18 can formulate which of the products best suits the user's needs, regardless of price, or can add or include price as a parameter. This information can then be forwarded back to the client device 12. In an alternate embodiment of the present invention, the topology of the apparatus of the present invention 10 can include a client relation module 20 which contains client relation manager 22 that is operably connected to a client relation database 24. In yet another alternate embodiment of the present invention, the correlation engine database 72 can be operably connected to the correlation engine 18 to store information regarding various user requests and responses thereto. The information in the correlation engine database 72 can then be forwarded to the EGate Interface 74 and the database 76 for post-sale processing. The database 76 can contain any type of relevant information. In the present wellsite example, the database 76 can contain common and/or proprietary information, such as business data from many wellbores and/or results from other applications. The database 76 can be general in nature, or it may be application-specific.

Figure 2:
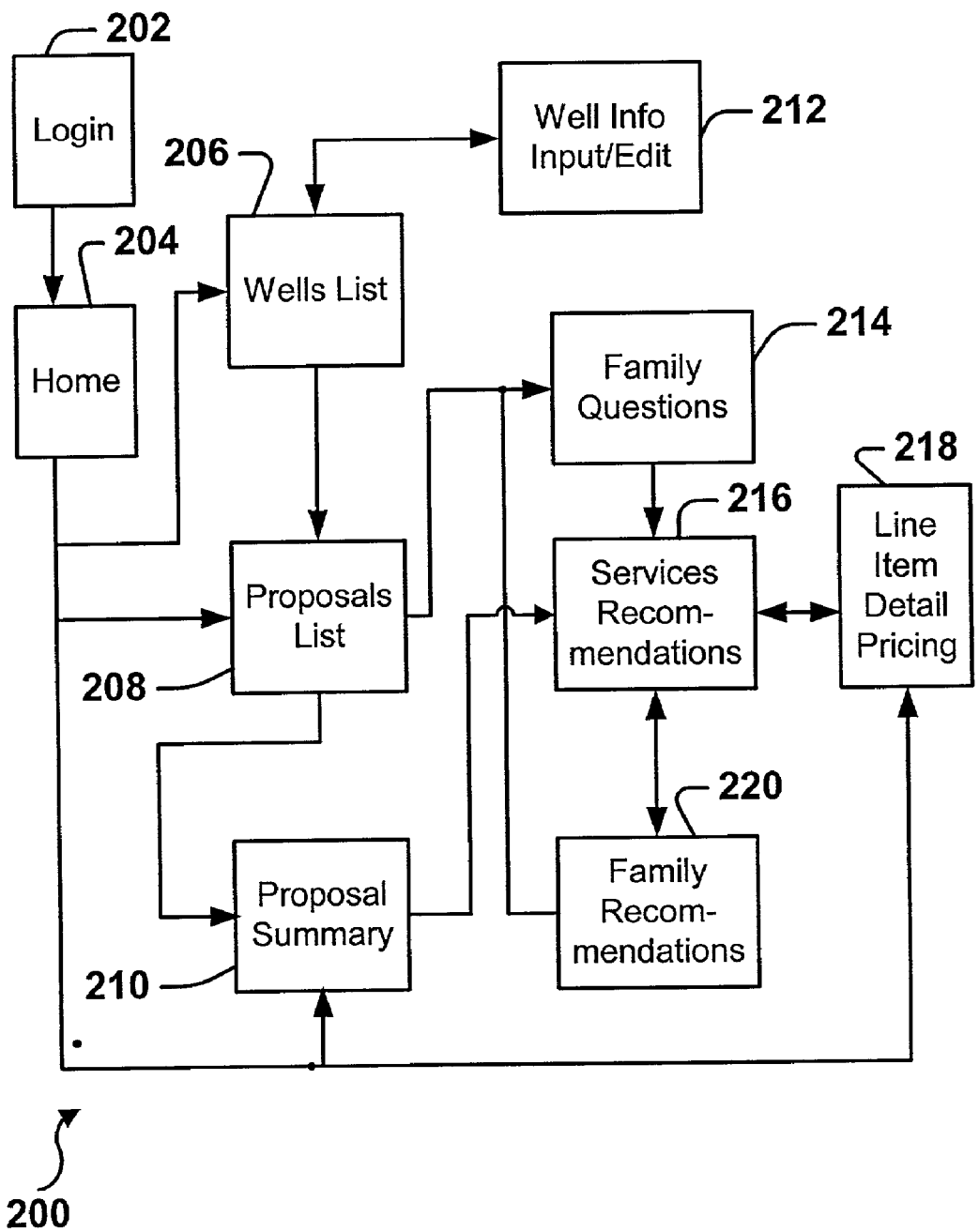
FIG. 2 is a flowchart illustrating the various methods for gathering user requirements and deriving results of an embodiment the present invention.

Attention is directed to FIG. 2, which is a flow diagram illustrating various pathways and methodologies for obtaining information from the user and providing information to the user. The process 200 begins generally at step 202, where the user logs in to the system of the present invention through some type of authentication scheme, typically requiring a username and password. Upon authentication, execution moves to step 204 where a homepage is presented to the user (on, for example, the web browser 12 of FIG. 1). The user is provided with a list of choices. Typically, the choices are incorporated into the home page via a web hyperlink to, for example, the wells list 206, a proposals list 208, and the proposal summary 210. Upon selecting, for example, the wells list 206, the user can feed information into the well info input/edit screen 212 or provide information to the proposals list 208, as illustrated in FIG. 2. Similarly, the results from the proposals list 208 can feed information into the proposal summary 210. The proposals list 208 can feed information into the family questions 214. The family questions 214, in turn, gathers input from the user and provides information, in addition to any information from the proposals list 208, ultimately to the services recommendations screen 216. The services recommendations screen 216 can take information from the family questions screen 214, and can also accept information from the proposal summary 210. Similarly, the family questions screen 214 can receive input from the family recommendations screen 220, as well as the proposals list 208. The Line Item detail pricing list 218 can be generated from information received from the services recommendations screen 216, as well as from the proposal summary screen 210. In the preferred embodiment of the present invention, the Line Item contains a two-part descriptor: HL (high level) and LL (low level). The HL descriptor is the general descriptor, and the LL descriptor is a modifier. For example, a priced line item for wireline products and services in North America typically contain a two-part descriptor, HL and LL. According to the present invention, the detail pricing and ranking available in the Line Item detail pricing screen 218 is provided to the user as a summary for a specific set of information. It will be clear to those skilled in the art that a wide variety of product pricing information can be derived from the embodiment illustrated. Moreover, it will also be clear that the above-described steps are not order-specific and can be accomplished in a wide variety of sequences to accomplish the same result.

Figure 3:
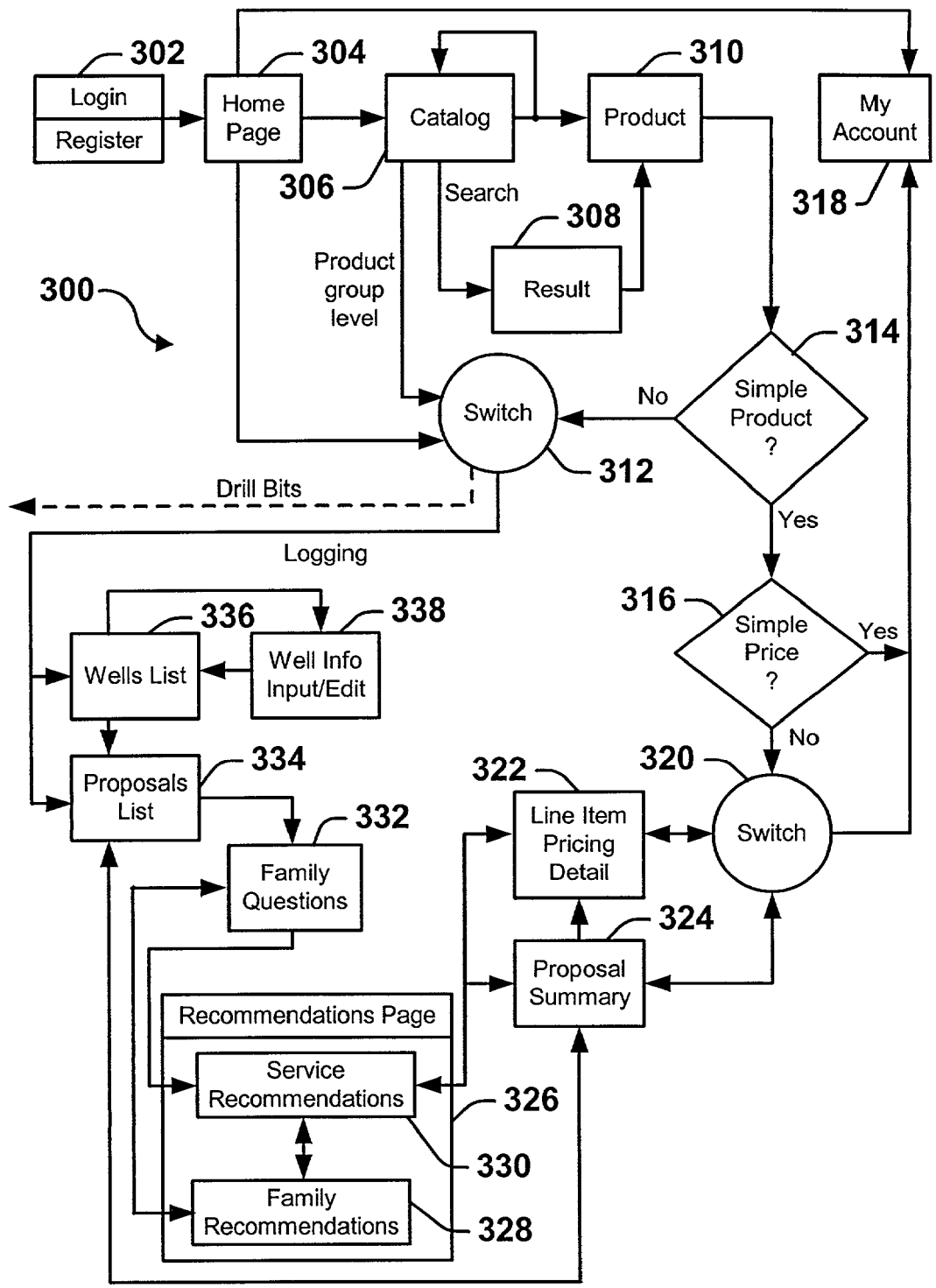
FIG. 3 is a flowchart of an embodiment of the method of the present invention.

Turning now to FIG. 3, which illustrates an embodiment of the method of the present invention, the method 300 begins at step 302 wherein the user logs into the system via an authentication scheme typically requiring a user name and/or password authentication. The authentication scheme can be encrypted using, for example, SSL 128-bit encryption capability. Alternate encryption schemes, of course, can be used without detracting from the spirit or intent of the present invention. Once the user has been properly authenticated, execution moves to step 304, where the user is presented with a home page, indicating various functionality and features available to the user. At this point in the process, the user may select to review the shopping cart, or basket, figuratively called My Account 318, or the user may review products that are in the catalog 306 and/or may seek advice via the switch 312. A company may offer very dissimilar product lines. For example, in the oilfield, one product line could be drilling bits and wireline services. Although both are oilfield products and services, the characteristics of each group (sales channel, user application scenarios, pricing algorithms and contracts, etc.) may be significantly dissimilar. Therefore, the methodology to advise and price the products within the product group may require product group-specific pricelists, pricing methodologies, advisor questions, etc. The present invention can accommodate the need for flexibility because the switch 312 can receive information from the catalog 306 at the product group level. Moreover, the user may initiate a search for various catalog items to generate a result, at step 308, for a list of products. At step 310, the products information is generated and the product list from step 310 is then reviewed at step 314 to determine whether or not there is a simple product. If the product is not simple, then execution moves back to step 312 where the advisory elements of the present invention are implemented. If the product is simple, i.e., requiring no specific advisory input, then execution moves to step 316 where a determination is made whether or not the pricing is simple. If the pricing is simple, then execution moves to step 318, and the user is allowed to place the simple products with simple prices into the shopping cart. If the pricing is not simple, i.e., the result of step 316 is negative, then execution moves to step 320. At step 320, the switch enables various measures such as complex pricing information, or product listing and feature information, to be used and reviewed. For example, execution can move from step 320 to step 322 where Line Item pricing detail information is generated. The pricing information based on a user's request can also be fed into the recommendations page 326 that contains service recommendations 330 and family recommendations 328 for user input. Moreover, user input regarding family questions from step 322 can be used to input the service recommendations at step 330. Similarly, at step 334, a proposals list can be generated from information provided by step 312, as well as, for example, the wells list that is generated at step 336. The wells list generated at step 336 itself can be provided with, for example, logging information from the switch step 312 and the well information input/edit step 338. All of this information then can be funneled back to the user or it can be used to generate some type of output at step 322, or it can be used to generate a proposal summary in step 324. Once the Line Item detail pricing information step 322 is completed, either the proposal summary from step 324 is used to finalize the Line Item pricing detail of step 322 or the information can be used directly to complete the pricer information of step 320. Once the pricer information of step 320 is completed, that information is fed into the user's account to complete step 318. Either the sale is consummated at step 318 or execution is moved back to step 304 to browse or to transact another purchase.

Figure 4:
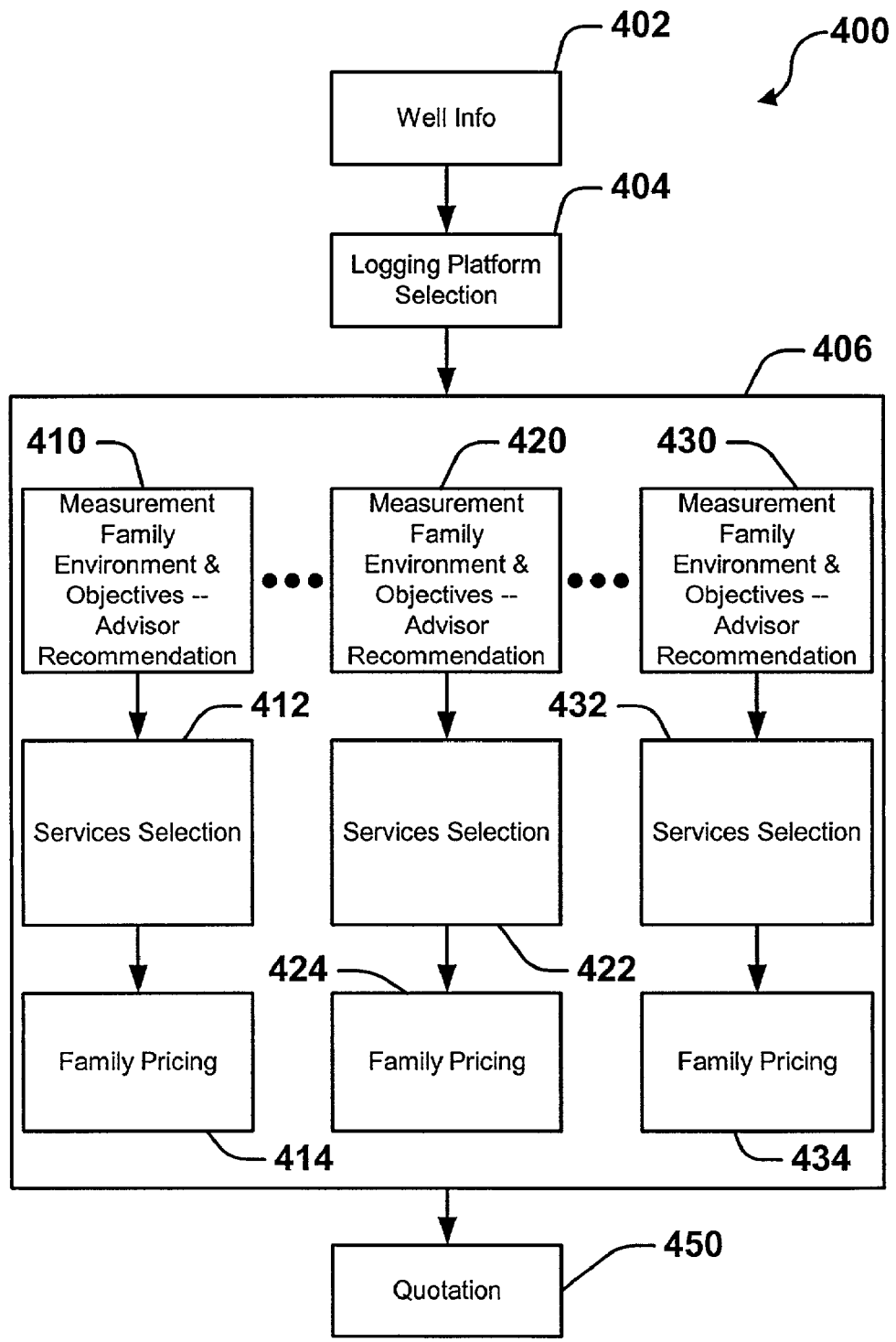
FIG. 4 is a flowchart of an alternate embodiment of the method of the present invention.

FIG. 4 illustrates an alternate embodiment of the method of the present invention as an example pertaining to the petrochemical industry. The present invention, however, is equally applicable to other industries with similar good effect. This specific embodiment pertains to a selection of oil well information and logging selection. The method 400 starts generally at step 402 where well information is provided by the user. Execution then moves to step 404 where the logging platform process is completed. From the results of the step 404, execution moves generally to step 406.

Step 406 encompasses a set of step-streams, as illustrated in FIG. 4, any number of which may be required, depending upon what information is provided by the user. Any one of the step-streams may be used to complete step 406. There is no requirement that all step-streams be completed in order to accomplish step 406. For other situations, the present invention can utilize two or more step-streams to complete step 406. The determination of how many step-streams are used, i.e., one, two, three or more, is based upon the user's particular requirements. In the preferred embodiment of the present invention, three step-streams are initialized, although only one is needed for completion of step 406.

The first step-stream of step 406 begins at step 410 of the first step-stream (used as an example), where the measurement family and environment objectives that are advisor recommendations are completed using information that can be retrieved by the advisor database through the advisor function module 50 (see FIG. 1). After the advisor recommendation is done, execution moves to step 412 where there is a selection of services. Thereafter, execution moves to step 414 where family pricing information is added. A second step-stream is illustrated beginning at step 420 with an environment measurement and objectives advisor recommendation similar to the previous step-stream. Another selection services selection step 422 is completed along with an additional family pricing step 424. Yet another family environment measurement and objectives advisor recommendation can commence at step 430. Thereafter, similar to the other step-streams, services can be selected in step 432 and family pricing can be generated in step 434. These various streams are illustrative. More or fewer of these processes can be added to step 406 in order to generate the proper response to the user, for example, based on user input and/or advisor calculation. The method ends, finally, in step 450 where a quotation is presented to the user for selection of various products.

Figure 5:
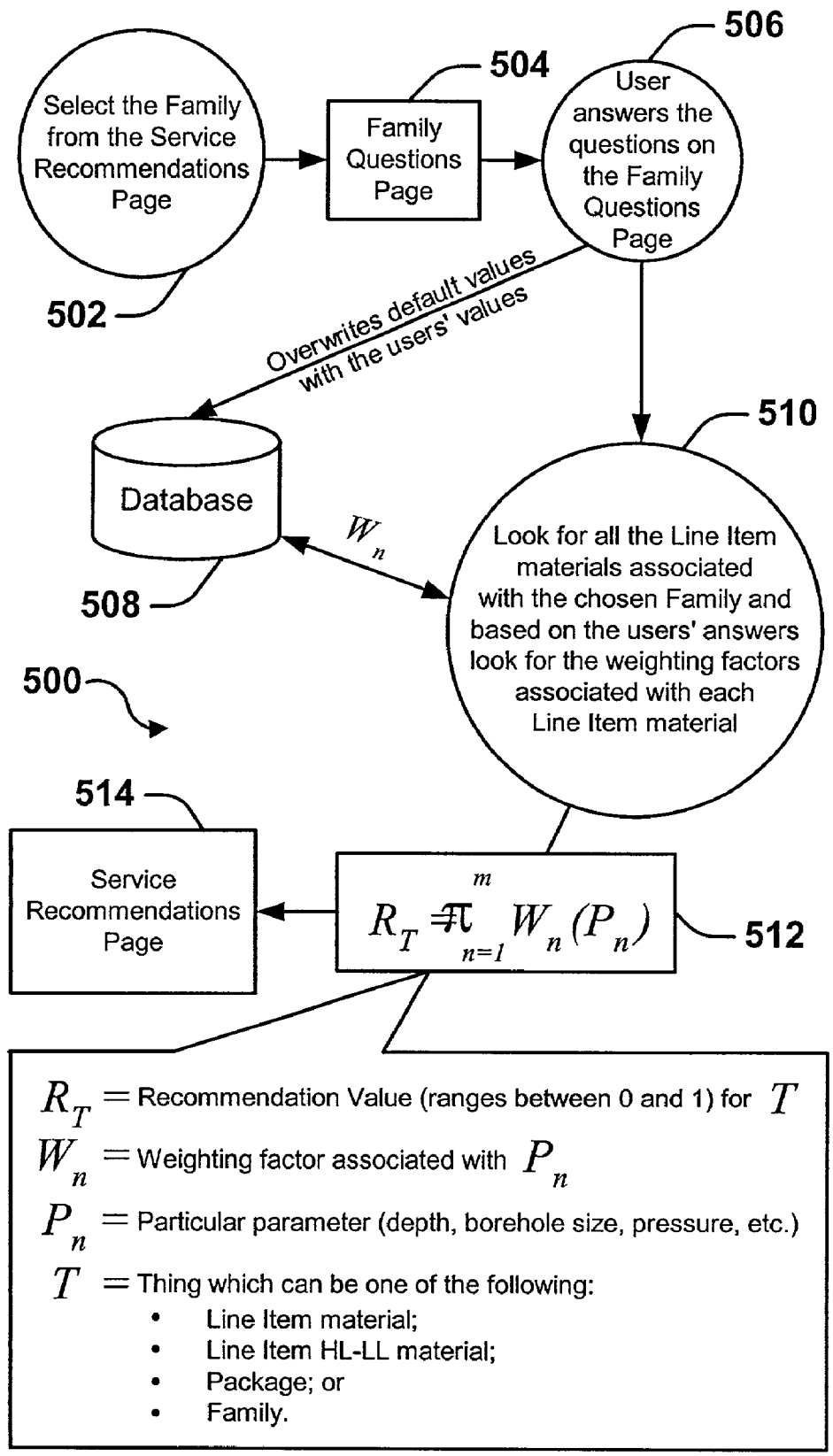
FIG. 5 is a flowchart of another alternate embodiment of the method of the present invention.

Attention is now directed to FIG. 5 which illustrates yet another method of the present invention. Method 500 begins generally at step 502 wherein the selection of the family from the service recommendations page is completed by the user. Other input from the user is then taken at step 504 from the family questions page. Thereafter, execution moves to step 506 wherein the user answers questions of the family questions page. Based on the answers on the family questions page (step 504), default values contained within the database 508 can be overridden by the user's input values. Otherwise, default values from the database are used in step 508. A waiting factor "$W_n$" that is associated with particular parameters, for example, depth, borehole size, pressure, and/or various other features of any of the particular products in question can be provided. Information from the user's answers to the family questions page (step 504) are also passed on both from the information determined in step 506 and also from the weighting factor generated in step 508. Execution moves to step 510 wherein the function looks for all of the Line Item materials associated with the chosen family and, based on the user's answers, looks for the weighted factors associated with each Line Item material. Thereafter, execution moves to step 512 where the recommendation value is generated. Typically, the recommendation value is between zero and one, although any range is useful so long as it is comparable to other recommendation values in a form necessary for ranking. These recommendation values are made for various products "T", as illustrated in FIG. 5. The recommendation values are a function of the weighting factor which in itself is associated with the particular parameters, per the formula illustrated in step 512 of FIG. 5, namely:

$$R_T = \prod_{n=1}^{m} W_n(P_n).$$

Once the recommendation value is generated, the service recommendations page is generated in step 514 and presented to the user for selection of the various products.

Although the present invention has been described with several embodiments, a myriad of changes, variations, alterations, transformations, and modifications may be suggested to one skilled in the art, and it is intended that the present invention encompass such changes, variations, alterations, transformations, and modifications as fall within the scope of the appended claims.

What is claimed is:

1. An apparatus that provides quantitative and qualitative recommended oilfield products or services to a user as a result of a request having user requirements inputted by a user, said apparatus comprising:

a computer processor;

a server engine executing on the computer processor, said server engine constructed and arranged to accept the request having one or more user requirements from the user and send a response having a plurality of recommended oilfield products or services responsive to the one or more user requirements thereto;

a storage device configured to store:

a pricing database, said pricing database constructed and arranged to store pricing information and to retrieve pricing information;

an advisor database, said advisor database constructed and arranged to store advisor information and to retrieve advisor information;

a catalog database, said catalog database constructed and arranged to store product information and to retrieve product information; and a correlation engine database operatively connected to a correlation engine, said correlation engine database constructed and arranged to store a result of said correlation engine and requests from said user;

a content relationship manager executing on the computer processor, said content relationship manager constructed and arranged to store and to retrieve client relationship data;

the correlation engine executing on the computer processor and configured to:

retrieve pricing information regarding the plurality of oilfield products or services from said pricing database through a pricing function module, the oilfield product or service comprising a plurality of parameters;

retrieve advisory information regarding the oilfield products or services from said advisor database through an advisor function module;

retrieve catalog information regarding the oilfield products or services from said catalog database through a catalog module;

generate, using the computer processor, a plurality of weighting factors associated with the plurality of parameters;

calculate, using the computer processor, a recommendation value for the plurality of oilfield products or services based on a function of the plurality of weighting factors, the recommendation value reflecting an extent the oilfield product or service satisfies the one or more user requirements; and generate, using the computer processor, a ranked list comprising the plurality of oilfield products or services, a position of the oilfield product or service in the ranked list is determined based on the recommendation value, to form said response;

said pricing function module operatively connected to said pricing database and said correlation engine;

said advisor function module operatively connected to said advisor database and said correlation engine; and said catalog module operatively connected to said catalog database and said correlation engine.

2. The apparatus of claim 1 wherein the plurality of parameters comprises at least one selected from a group consisting of a borehole size, a borehole depth, and a borehole pressure.

3. An apparatus that provides quantitative and qualitative recommended oilfield products or services to a user as a result of a request having user requirements inputted by a user, said apparatus comprising:

a computer processor;

a server engine executing on the computer processor, said server engine constructed and arranged to accept the request having one or more user requirements from the user and send a response having a plurality of recommended oilfield products or services responsive to the one or more user requirements thereto;

a storage device configured to store:

a pricing database, said pricing database constructed and arranged to store pricing information and to retrieve pricing information;

an advisor database, said advisor database constructed and arranged to store advisor information and to retrieve advisor information;

a catalog database, said catalog database constructed and arranged to store product information and to retrieve product information; and a correlation engine database operatively connected to a correlation engine, said correlation engine database constructed and arranged to store a result of said correlation engine and requests from said user;

a content relationship manager executing on the computer processor, said content relationship manager constructed and arranged to store and to retrieve client relationship data;

the correlation engine executing on the computer processor and configured to:

retrieve pricing information regarding an oilfield product or service from said pricing database through a pricing function module, the oilfield product or service comprising a plurality of parameters;

retrieve advisory information regarding the oilfield product or service from said advisor database through an advisor function module;

retrieve catalog information regarding the oilfield product or service from said catalog database through a catalog module;

generate, using the computer processor, a plurality of weighting factors associated with the plurality of parameters;

calculate, using the computer processor, a recommendation value for the oilfield product or service based on a function of the plurality of weighting factors, the recommendation value reflecting an extent the oilfield product or service satisfies the one or more user requirements; and generate, using the computer processor, a ranked list comprising the plurality of oilfield product or service, a position of the oilfield product or service in the ranked list is determined based on the recommendation value, to form said response;

said pricing function module operatively connected to said pricing database and said correlation engine;

said advisor function module operatively connected to said advisor database and said correlation engine; and said catalog module operatively connected to said catalog database and said correlation engine.

4. The computer system of claim 3 further comprising:

a database, the database operative with the correlation engine, the pricing function module, the advisor function module, and the catalog.

5. The computer system of claim 4, wherein the database is operative with an egate interface.

6. The computer system as in claim 3 further comprising a pricing database operative with the pricing function module.

7. The computer system as in claim 3 further comprising an advisor database operative with the advisor function module.

8. The computer system as in claim 3 further comprising a catalog database operative with the catalog.

9. The computer system as in claim 3 further comprising a pricing database operative with the pricing function module.

10. The computer system of claim 3 further comprising a client relationship manager.

11. The computer system of claim 10, wherein the client relationship manager has a customer relationship management module operative with the correlation engine.

12. The computer system of claim 11, wherein the client relationship manager is operative with client relationship data.

13. The computer system of claim 3 wherein the plurality of parameters comprises at least one selected from a group consisting of a borehole size, a borehole depth, and a borehole pressure.

14. A method of providing to a user a ranking of oilfield elements from an online catalog according to a user-specified criteria comprising:

receiving at a server engine, which is executing on a processor of a computer system, a request from the user regarding a plurality of oilfield elements in the online catalog, the request including one or more user requirements;

retrieving information about each of the oilfield elements, wherein each of the oilfield elements comprises a plurality of parameters;

determining if each oilfield element is simple;

if an oilfield element is not simple, then obtaining advisory input about the not-simple oilfield element from an advisory module;

determining if the pricing of each oilfield element is simple;

if the pricing of an oilfield element is not simple, then obtaining pricing input about the not-simple pricing from a pricing module;

generating by a correlation engine of the computer system, a plurality of weighting factors associated with the plurality of parameters and calculating a recommendation value for each oilfield element based on a function of the plurality of weighting factors, wherein the recommendation value reflects an extent the oilfield element satisfies the user requirements; and presenting by the computer system, the user with a list of elements comprising the plurality of oilfield elements, wherein the list is ranked using the recommendation values of the two or more oilfield elements.

15. The method of claim 14 wherein the plurality of parameters comprises at least one selected from a group consisting of a borehole size, a borehole depth, and a borehole pressure.

16. A method of providing, to a user, a ranking of oilfield elements from an online catalog according to a criteria specified by the user comprising:

receiving at a server engine a request from the user regarding a plurality of oilfield elements in the online catalog, the request including one or more user requirements;

retrieving information about each of the elements, wherein each of the oilfield elements comprises a plurality of parameters;

determining if each oilfield element is simple;
  if an oilfield element is not simple:
    obtaining advisory input about the not-simple oilfield element from an advisory module;
  determining if the pricing of each oilfield element is simple;
    if the pricing of an oilfield element is not simple:
      obtaining pricing input about the not-simple pricing from a pricing module;
      prompting the user to input additional preference information based upon the advisory input and the pricing input;

generating a plurality of weighting factors associated with the plurality of parameters and calculating a recommendation value for each oilfield element based on a function of the plurality of weighting factors, wherein the recommendation value reflects an extent the oilfield element satisfies the user requirements; and using the computer system, presenting the user with a list of elements comprising the plurality of oilfield elements, wherein the list is ranked using the recommendation values of the two or more oilfield elements.

17. An apparatus that provides quantitative and qualitative recommended oilfield products or services to a user as the result of a request having user requirements inputted by the user, said apparatus comprising:

a computer processor;

a server engine executing on the computer processor, said server engine constructed and arranged to accept the request having one or more user requirements from the user and send a response having a plurality of recommended oilfield products or services responsive to the user requirements thereto;

a storage device configured to store:
  a pricing database, said pricing database constructed and arranged to store pricing information and to retrieve pricing information;
  an advisor database, said advisor database constructed and arranged to store advisor information and to retrieve advisor information;
  a catalog database, said catalog database constructed and arranged to store product information and to retrieve product information; and
  a correlation engine database operatively connected to a correlation engine, said correlation engine database constructed and arranged to store a result of said correlation engine and requests from the user;

a content relationship manager executing on the computer processor, said content relationship manager constructed and arranged to store and to retrieve client relationship data;

the correlation engine executing on the computer processor and configured to:
  retrieve pricing information regarding the plurality of oilfield products or services from said pricing database through a pricing function module, the oilfield product or service comprising a plurality of parameters;
  retrieve advisory information regarding the oilfield product or service from said advisor database through an advisor function module;
  retrieve catalog information regarding the oilfield product or service from said catalog database through a catalog module;
  generate, using the computer processor, a plurality of weighting factors associated with the plurality of parameters;
  calculate, using the computer processor, a recommendation value for the oilfield product or service based on a function of the plurality of weighting factors, the recommendation value reflecting an extent the oilfield product or service satisfies the one or more user requirements; and
  generate, using the computer processor, a ranked list comprising the plurality of oilfield products or services, a position of the oilfield product or service in the ranked list is determined based on the recommendation value, to form said response;

said pricing function module operatively connected to said pricing database and said correlation engine;

said advisor function module operatively connected to said advisor database and said correlation engine; and said catalog module operatively connected to said catalog database and said correlation engine.

18. An apparatus as in claim 17 wherein the oilfield service is a wireline service.

19. The apparatus of claim 17 wherein the plurality of parameters comprises at least one selected from a group consisting of a borehole size, a borehole depth, and a borehole pressure.

* * * * *